March 19, 1963  R. J. MADDISON ETAL  3,082,111
CORRECTIVE BACKFILL COMPOSITION
Filed June 14, 1960  4 Sheets-Sheet 1

INVENTORS
ROBERT J. MADDISON
JOHN F. LOERTSCHER, JR.
BY
ATTORNEYS

United States Patent Office 3,082,111
Patented Mar. 19, 1963

3,082,111
CORRECTIVE BACKFILL COMPOSITION
Robert J. Maddison, Caldwell, and John F. Loertscher, Jr., Wayne, N.J., assignors to Whitehead Brothers Company, New York, N.Y., a corporation of New Jersey
Filed June 14, 1960, Ser. No. 36,016
8 Claims. (Cl. 106—286)

This invention relates generally to compositions of matter having high thermal conductivity and more particularly to compositions of matter having high density and high thermal conductivity suitable for providing an environment for high-voltage buried electric transmission lines.

Most all areas regularly require an increase in the amount of electric power distributed to them. Often, existing electric distribution facilities are inadequate to carry the increased load. In this event, additional electric distribution facilities must be installed. In many cases, extensive urbanization makes it undesirable or impossible to construct the required additional distribution facilities above the ground. In addition, the susceptibility of overhead electric distribution facilities to damage from wind storms and electrical storms is a factor weighing against their construction. When overhead facilities are impracticable, an underground installation is necessary.

The high cost of an underground installation of electric transmission facilities requires the efficient use of such facilities. A major limitation upon the amount of power a buried electric cable can transmit results from the heat generated by the flow of electric current which must be dissipated. For electric power transmission cables buried in surrounding environments having only moderate heat-conducting ability, it is recognized that current should be limited so that the heat in the conductor does not exceed approximately 70° C. Temperatures above this result in heating the environment to such an extent that it loses much of its ability to transfer heat effectively away from the conductor. Once the heat-conducting property of the environment contacting the conductor is reduced, the conductor tends to overheat. Heating of the conductor increases its electrical resistance. Since the power loss in a resistance is proportional to its temperature, the power loss in the conductor in the form of heat increases with the temperature of the conductor. Thus, not only is less heat conducted away from the cable when the environment loses its ability to conduct heat effectively, but the resulting increase in temperature causes increased heat to be accrued in the conductor. Overheating may become severe enough to cause destruction of the conductor, its insulation, or both.

In considering the amount of power a buried cable can transmit, the restrictions resulting from non-uniformity of surrounding environment must be taken into account. In order to operate the underground transmission facility efficiently, it is necessary for the environment surrounding the cable to conduct heat away at a rate sufficient to maintain the temperature of the conductor at a safe level. If the material removed from the trench in which the cable is laid is used for refilling the trench, serious difficulties may result. The material found along the route of an underground cable usually varies widely in heat-conducting properties. In such an environment, the whole length of the buried cable must be operated at a rating low enough to be compatible with the soil areas having poorest heat conductivity. When this is the case, those portions of the buried cable run having soils with good heat conductivity will be operating below rated capacity.

One attempted solution to the problems created by non-uniform cable environment is to pump oil between the electric conductor and its protective sheathing so that heat generated in areas of poor heat-conducting soil is dissipated at areas along the cable having a contacting environment with better heat-conducting properties. However, this solution requires equipment which is expensive to install and costly to operate.

A further improvement resulted from providing a uniform environment for the buried cable throughout its length, so that heat is conducted away from the protective sheathing equally well at every point along the cable run. The uniform material used for the contacting environment about the protective sheathing must be compacted about the protective sheathing to a thickness sufficient to render the effects of the non-uniform heat-conducting properties of the surrounding soils negligible. Large amounts of heat may be readily transferred from the uniform environment to the adjacent soil since the area of their contact is relatively large. Owing to this large area of contact between the uniform environment and the surrounding soil, even the poorest heat-conducting soils can absorb large amounts of heat. By means of a uniform environment, the whole cable run may be efficiently utilized up to a capacity limited by the general ability of the uniform environment to transmit heat away from the cable.

Material selected for the purpose of refilling trenches in which cables have been laid is termed "corrective backfill," hereinafter referred to as "backfill." It is desirable for the backfill material to have other properties as well as heat-conducting ability.

The backfill for use with a buried cable must have a low dielectric property. That is, the backfill should exhibit little tendency to produce eddy currents under the influence of magnetic fields from the buried cable. This requirement excludes the use of conducting material such as metallic substances, in the backfill.

The backfill composition must be workable so that it may be installed by pouring and compacting or by other simple procedures. That is, the backfill should have some degree of fluidity during its installation.

There must be no particles in the backfill composition which will be large enough to damage the protective coating of the cable when the backfill is dumped into the trench. It has been determined that, in view of existing coating materials, the practical limit in size for backfill particles is that size of material barely capable of passing a standard ¼" screen. For that reason particles retained on a ¼" screen have been excluded from the backfill composition.

Backfill may be comprised of crushed rock, gravel, sand, or the like, without regard to the particle sizes of such materials. Quartz or silica sand has relatively good heat-conducting properties. Heat-conductivity of any such material however, is considerably enhanced by mixing predetermined proportions of particle sizes so that a high-density composition results. It is found that the higher the density of the backfill composition, the greater the heat conductivity.

Use of a specially-mixed backfill having high heat conductivity allows the cable to be operated at a higher rated capacity. A high heat conductivity backfill will maintain the electric cable at a safe temperature.

Various theories have been evolved as to the geometries of mixed shapes which yield maximum density. These theories assume that particles are randomly oriented, have friction one against the other, are irregularly shaped, and so forth. These theories attempt to give formulas which specify the proportions of various particle sizes that, when mixed together, result in a dense composition having small interstices between the particles. However, these theories have not been useful in finding the optimum mixes. Higher densities of mixes have been obtained by experimentation.

We have found that high-density sand mixes are made more suitable for backfill purposes by the inclusion of moisture and a small amount of clay. It is probable the clay and moisture contribute to a higher density by lubricating the various-sized sand particles so that they may slip to compact more closely together and by filling the remaining interstices between the sand particles. In addition, the heat conductivity of the composition is improved by the coherence of the resulting contiguous mass.

We have found that the proportions of constituents of our backfill compositions are fairly critical, slight variations in proportion having a large influence on the density and thus the heat-conductivity of our material. The amount of moisture has an effect upon both density and heat-conductivity, the composition becoming less dense and losing a significant degree of heat-conductivity if completely dried out. However, moisture content is not a great problem in our backfill compositions, as our buried backfill will naturally retain nearly all of its moisture content. Furthermore, the conditions required for drying out our backfill are so extreme as not to be expected in normal installations.

One mixture suitable for backfill has been produced by the present inventors. This mixture has been in successful commercial use for some time. The formula for this backfill is given below for comparison purposes with the formulas of the present invention.

The procedure for making up a backfill formula is as follows: A sample of sand from a particular sand deposit is analyzed by determining clay content and then sifting the remainder through a standard series of screens, each progressively smaller. Sifting is performed by placing a nest of screens in a tapping and vibrating machine until the sand retained on each screen stabilizes in accordance with the procedure as outlined in paragraphs 14–17 and 25–38 of the Foundry Sand Handbook, published by the American Foundrymen's Society (6th ed., 1952). The sand retained on each screen is then weighed. The sample is then identified in terms of the percent of sand retained on each screen and the results of the clay analysis. Note that sand retained on a particular screen is a grouping of all sizes between those which could pass the previous screen and those barely small enough to escape this particular screen.

A number of different sand deposit samples are similarly analyzed. The backfill mixture formula is specified in terms of percent sand by weight of similar screen groupings, clay and water content. Sands from various deposits are thoroughly mixed together to obtain a final mixture of sand sizes and clay content agreeing with the backfill formula. If the sand mixture is deficient in certain particle sizes, these must be obtained from large-scale screening of raw material and added as required. Clay may be added if necessary and the moisture content regulated. The mixture is then ready for application.

While the backfill currently available for commercial use has good heat-conducting properties, mixtures of higher density may be obtained by use of the materials of the present invention. These improved mixtures are observed to be more dense than any previous mixture. Furthermore, the improved densities have a highly significant and unexpected effect upon the heat conductivity of the backfill mixture. We have found that a slight increase in density over the densities heretofore achieved results in a vastly disproportionate increase in the heat conductivity of the mixture. Among the improved backfill mixtures of the present invention, density and heat conductivity have an approximately linear relation. But as a group, the improved backfill mixtures of the present invention have an unexpected heat conductivity compared to mixtures heretofore known. Accordingly, it is the object of this invention to provide an inexpensive composition of matter including silica sand, clay and water having a higher density than has been previously available. It is a further object of this invention to provide an improved composition of matter having improved ability to conduct heat.

It is another object of this invention to provide an improved composition of matter having high density, large heat conducting ability, and low dielectric properties.

It is another object of this invention to provide an improved composition of matter suitable for conducting heat rapidly from a buried cable, thus permitting the cable to have a much higher rated capacity.

It is still another object of this invention to provide an improved composition of matter having unusal heat conducting properties that may be combined from available raw materials easily and inexpensively.

It is yet another object of this invention to provide an improved composition of matter having exceptional heat-conducting properties suitable for use in a variety of applications requiring material capable of rapidly transmitting large amounts of heat.

Briefly stated, the foregoing objects are accomplished by the provision of an improved composition of matter comprised of selected size ranges of mineral particles such as silica sand in proportions designed to effect a very high density when mixed together by ordinary means. Moisture and cohering matter may be added in a sufficient amount to provide a compact mass having excellent heat-conducting properties. While the cohering matter may be comprised of various substances we prefer to use kaolinitic clay.

These and other features of the invention will become apparent from the following description taken in conjunction with the figures illustrating various features of the invention, in which.

Figure 1:
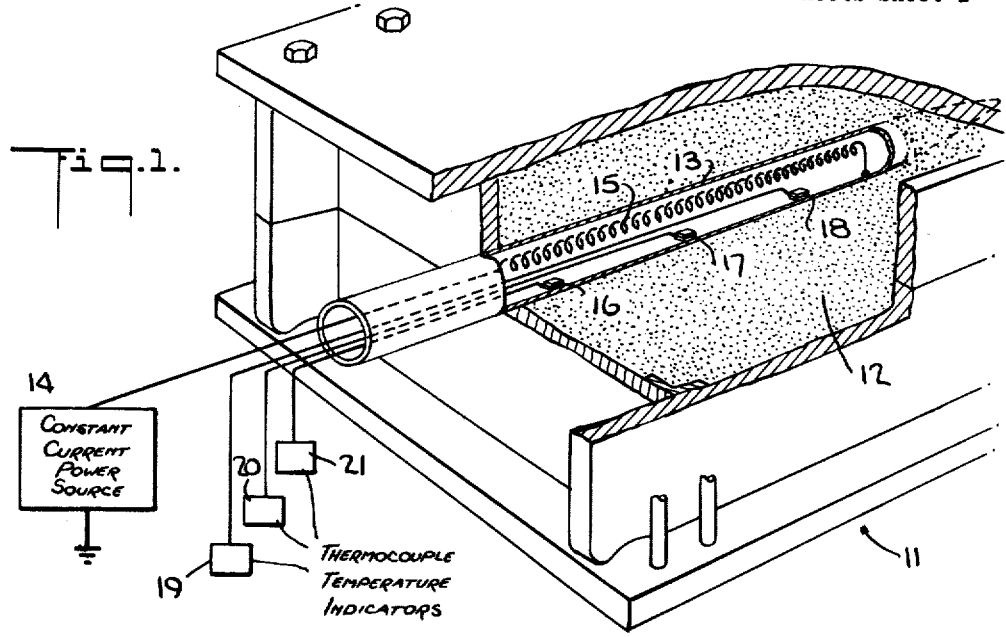
FIG. 1 shows electric test apparatus for determining the thermal resistivity of backfill compositions.
Figure 2:
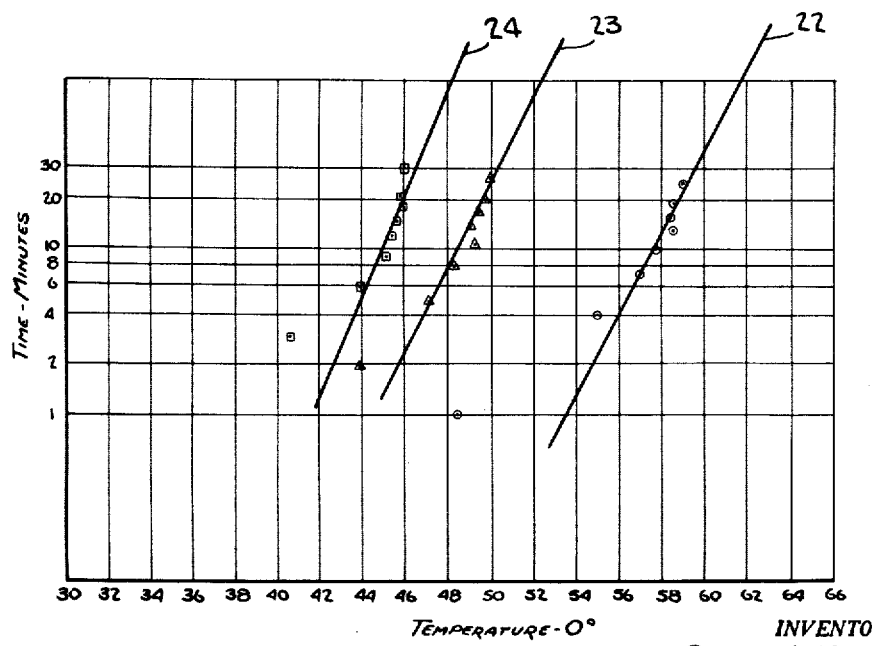
FIG. 2 is a graph showing slopes plotted from experiments made to determine the thermal resistivity of a composition.

Throughout this application, measurements of the heat conductivity of compositions are given in terms of thermal resistivity, symbolized by rho. Thermal resistivity is the inverse of heat conductivity. As thermal resistivity tends to 0, the composition is capable of conducting heat more rapidly. The general method for determining the thermal resistivity for soils as well as for measuring the rho of a backfill composition is that described by V. V. Mason and M. Kurtz in AIEE Technical Paper 52–128 (April 1952). The method employed to yield the rho values given herein is facilitated by the apparatus shown in FIGURE 1. A thermal test box 11 is filled with a composition 12 to be tested, into which a hollow stainless steel tube 13 is inserted. The composition 12 is compacted about the tube 13. At time 0 a constant current power source is switched on, which provides a constant current to heater 15 within tube 13. Readings of the temperature at thermocouples 16, 17 and 18 are continually taken by means of thermocouple temperature indicators 19, 20 and 21 respectively. The temperatures at the thermocouples are then plotted against time on a graph paper having a linear temperature dimension and a logarithmic time dimension. Lines are drawn through each of the three sets of plots to show the average slope of temperature vs. time at each thermocouple. FIGURE 2 shows a typical set of thermocouple plots and the slopes derived readings of the thermocouple indicators 19, 20 and 21. The rho of the material tested is proportional to the slope. Variations among the three slopes are due to factors inherent in testing by this simplified means: the cylindrical shape of the heat radiator, its finite radius, the finite size of the test box. The rho is taken to be the average of the rhos determined from the slopes. Rho is derived from slopes in the following manner using the example shown in FIGURE 2.

(1) $\quad Rho = K \times slope$

K is a factor found by dividing the fixed test factor of 665 by the power input to the heater in watts.

(2) $\quad K = 665/P$

In the test of FIGURE 2, the current through the heater was a constant 20 amperes and the voltage across the heater 16 volts.

(3) $\quad Power = I \times V$ or 320 watts. K is then 665/320=2.08. Thus rho would equal 2.08×slope. Slope may be expressed as the temperature rise in degrees centigrade over a time interval ten times the beginning of the time interval, given in minutes referred to time 0, the beginning of the test. In FIGURE 2, the slope of curve 22 is 4.1 for thermocouple 16, the slope of curve 23 is 4.0 for thermocouple 17, and the slope of curve 24 is 3.3 for thermocouple 18. The rhos are then 8.5 for thermocouple 16, 8.3 for thermocouple 17, and 6.9 for thermocouple 18. The average rho is then 7.9.

Density is expressed in grams per standard 2 inch cylindrical specimen having a 2 inch diameter and a height of 2 inches (6.28 cubic inches). The specimen is rammed three times in a standard ramming machine under standard foundry testing procedure at the maximum moisture content of the composition. The specimen is prepared by weighing out sufficient composition to yield the standard 2 inch specimen. The composition is rammed three times in the standard ramming form. If the end result of the ramming is exactly the right volume, as indicated by the zero grading mark in the ramming machine, the specimen is ready. If the volume is not exact, it is discarded and a new specimen is weighed out with slightly more or less material as needed. The ramming procedure is repeated until a specimen with the right volume is obtained. Maximum moisture is that amount of moisture just short of which compaction in the ramming machine causes puddling, that is, the squeezing out of water from the specimen during compression.

The backfill compositions are identified according to their densities in the standard ramming form at maximum moisture. The density of a solid quartz specimen having a volume equal to the standard foundry specimen of 6.28 cubic inches would be approximately 277.2–278.2 grams. (Quartz has a density of 2.65–2.66.)

Figure 3:
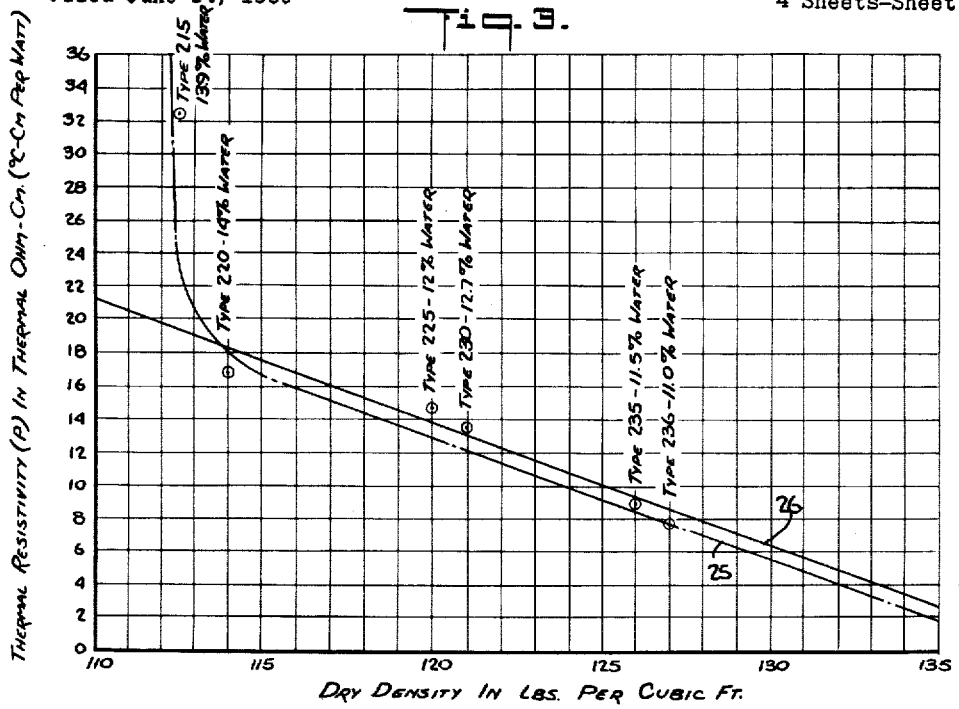
FIG. 3 is a graph showing the relationship between thermal resistivity and dry density for compositions of the present invention.

FIGURE 3 shows the relationship between several compositions of the present invention and their thermal resistivity in rhos. A composition of type 215, that is, having 215 grams per 2 inch specimen under the procedure as given for comparison purposes. Type 215 backfill has been produced by the present inventors for commercial use and is now well known. Curve 25 drawn through the density-rho coordinates of the type 215 composition and the density-rho coordinates of compositions of the present invention illustrates the discontinuity in thermal resistivity as related to the density of old compositions and the density of compositions of the present invention. Curve 26 illustrates the linear relationship between density and rho among compositions of the present invention. Compositions of the present invention were tested ranging from type 220 to type 236. These compositions were tested at moisture contents a few percent less than maximum moisture, thus more closely approximating conditions expected in actual underground installations. Thus the rho values shown in the chart of FIGURE 3 are somewhat higher than rhos which would have been obtained at maximum moisture.

The relationship between density and rho for compositions of the present invention may be expressed (4) $\quad Rho = 104 - \frac{dry\ density}{1.33} (lbs./ft.^3)$ The constant 104 in Formula 4 is derived from the classic equation for a straight line curve. That equation is (5) $\quad y = mx + b$ Assuming that $y=rho$, $x=d$ (dry density), $m$ is the slope of the curve and $b$ is the intercept of the curve on the $y$ axis, then the formula for the slope of curve 26 is as follows:

(6) $\quad m = \frac{rho_2 - rho_1}{d_2 - d_1}$

Substituting in Formula 6 for values obtained from curve 26 in which $rho_1=18$ and $d_1=114.5$, $rho_2=12$ and $d_2=122.5$, the following value for $m$ is obtained.

(7) $\quad m = \frac{12 - 18}{122.5 - 114.5} = -6/8$ $$m = \frac{-1}{1.33}$$

Therefore, substituting this value in Formula 5, the value $b$ is:

(8) $\quad b = rho_1 = md_1 = 18 + \frac{114.5}{1.33}$ $$b = 104$$

The screen analysis of each of the compositions shown on the chart in FIGURE 3 is given below. In each case, the analysis is made as hereinbefore set forth.

The moisture content of a specimen is determined by taking a 100 gram sample, weighing it, drying it completely, and re-weighing it. The loss in weight indicates the water evaporated out of the sample. The number of grams lost is also the percent moisture contained in the original sample by weight.

The clay analysis is made by the following procedure. A 50 gram completely dried sample is washed in a sodium hydroxide solution according to standard clay analysis techniques. The weight of the sample after washing is subtracted from 50 grams, giving the weight of clay in the sample. Multiplication by 2 of the clay weight gives the percent clay by weight in the original sample.

COMPOSITIONS SHOWN IN FIGURE 3

*Type 215*

| U.S. screens: | Percent retained on |
|---|---|
| 6 | 4.0 |
| 12 | 7.6 |
| 20 | 14.4 |
| 30 | 7.0 |
| 40 | 8.6 |
| 50 | 7.0 |
| 70 | 12.8 |
| 100 | 16.0 |
| 140 | 8.0 |
| 200 | 3.0 |
| 270 | 1.0 |
| Pan | 2.8 |
| Clay | 7.8 |

This composition tested type 215 with a maximum moisture content of 13.9% moisture. The test of thermal resistivity was made with a moisture content of 6.9%, and a resulting density of 191 grams. A rho of 32.5 was obtained at this lower moisture content and density.

*Type 220*

| U.S. screens: | Percent retained on |
|---|---|
| 6 | 6.6 |
| 12 | 11.0 |
| 20 | 16.0 |
| 30 | 8.4 |
| 40 | 8.0 |
| 50 | 6.6 |
| 70 | 8.6 |
| 100 | 8.0 |
| 140 | 6.4 |
| 200 | 5.0 |
| 270 | 2.0 |
| Pan | 4.6 |
| Clay | 8.8 |

This composition tested type 220 with a maximum moisture content of 14.0% moisture. The test of thermal resistivity was made with a moisture content of 9.4% and a resulting density of 214 grams. A rho of 17.5 was obtained.

Note the large decrease in rho from the type 215 composition (32.5 rhos) to the type 220 composition (17.5 rhos). An increase in density of only 5 grams per standard specimen (6.28 cubic inches) results in these specimens in an approximate halving of the rho factor. This is a highly significant decrease in rho for such a small variation in density, neither less dense nor more dense sand compositions exhibit change in rho to such a degree for a 5 gram density change.

*Type 225*

| U.S. screens: | Percent retained on |
|---|---|
| 6 | 25.6 |
| 12 | 34.4 |
| 20 | 10.6 |
| 30 | 1.4 |
| 40 | 1.0 |
| 50 | .8 |
| 70 | 1.6 |
| 100 | 3.0 |
| 140 | 4.8 |
| 200 | 4.8 |
| 270 | 1.8 |
| Pan | 4.4 |
| Clay | 5.8 |

This composition tested type 225 with a maximum moisture content of 12.0% moisture. The test of thermal resistivity was made with a moisture content of 8.6% and a resulting density of 215 grams. A rho of 14.6 was obtained.

Note the decrease in rho of 17.5 for a type 220 composition to 14.6 for the type 225 composition. Approximately a 3 rho change is involved for a 5 gram change in density.

*Type 230*

| U.S. screens: | Percent retained on |
|---|---|
| 6 | 15.8 |
| 12 | 29.0 |
| 20 | 15.8 |
| 30 | 4.0 |
| 40 | 3.6 |
| 50 | 3.0 |
| 70 | 3.0 |
| 100 | 3.2 |
| 140 | 4.6 |
| 200 | 4.6 |
| 270 | 2.0 |
| Pan | 4.4 |
| Clay | 7.0 |

This composition tested type 230 with a maximum moisture content of 12.7% moisture. The test of thermal resistivity was made with a moisture content of 8.0% and a resulting density of 206 grams. A rho of 13.5 was obtained.

The composition tested showed only a slight decrease in rho for a 5 gram increase in density when compared to a type 225 composition. It is probable the relation between density and rho for compositions more dense than 215 is approximately linear and that the variables of testing yield results which are slightly but not significantly non-linear. For example, the actual density of the test specimen as determined by the moisture content should be considered when plotting a density-rho curve. In the case of the 230 test specimen, its actual density tested 206 grams, less dense than the actual density of the 225 test specimen (215 grams). The thermal resistivity tests showed that the rho decreases with an increase in the type composition even though owing to slight variations in moisture content a particular type composition has a lower actual density than a lower type composition. However, extreme variations in moisture content will affect the rho more.

*Type 235*

| U.S. screens: | Percent retained on |
|---|---|
| 6 | 35.8 |
| 12 | 22.8 |
| 20 | 11.2 |
| 30 | 4.6 |
| 40 | 4.2 |
| 50 | 2.8 |
| 70 | 2.8 |
| 100 | 2.4 |
| 140 | 2.8 |
| 200 | 2.6 |
| 270 | 0.8 |
| Pan | 2.8 |
| Clay | 4.4 |

This composition tested type 235 with a maximum moisture content of 11.5% moisture. The test of thermal resistivity was made with a moisture content of 8.8% and a resulting density of 218.5 grams. A rho of 9.0 was obtained.

This composition showed a decrease in rho of approximately 4 for a 5 gram increase in density when compared to a type 230 composition.

*Type 236*

| U.S. screens: | Percent retained on |
|---|---|
| 6 | 41.4 |
| 12 | 17.0 |
| 20 | 7.0 |
| 30 | 3.2 |
| 40 | 3.4 |
| 50 | 2.6 |
| 70 | 3.0 |
| 100 | 3.2 |
| 140 | 4.0 |
| 200 | 4.0 |
| 270 | 1.4 |
| Pan | 3.6 |
| Clay | 6.2 |

This composition tested type 236 with a maximum moisture content of 11.0% moisture. The test of thermal resistivity was made with a moisture content of 8.8% and a resulting density of 228 grams. A rho of 7.9 was obtained.

Figure 4:
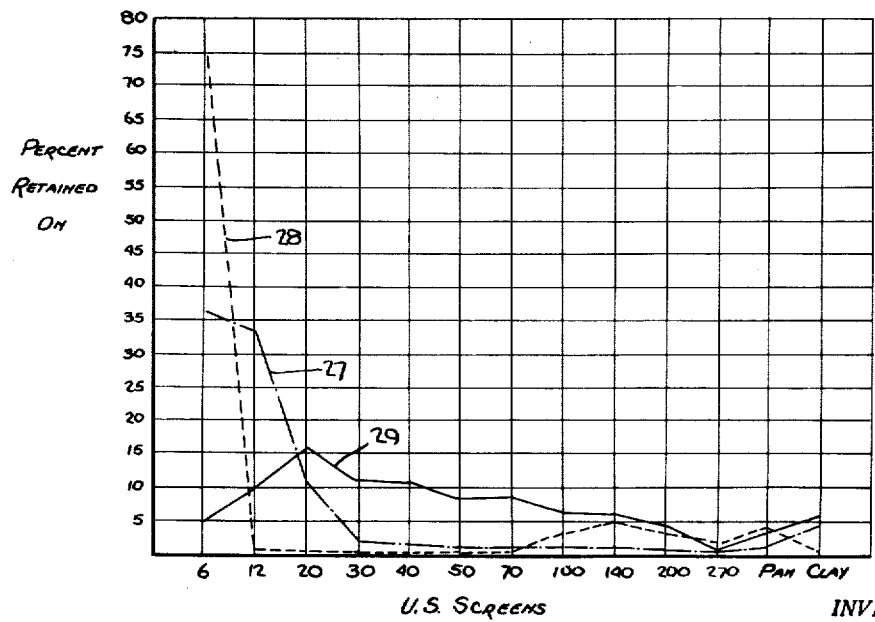
FIG. 4 is a chart showing the screen analyses of three typical compositions having the density of type 215 or less.

FIGURE 4 is a chart of the screen analyses of three typical compositions type 215 or under. These compositions are less dense than compositions of the present invention and are shown here for comparison purposes. Curve 27 shows the analysis of a type 182 composition. Curve 28 shows the analysis of a type 192 composition. Curve 29 shows the analysis of a type 215 composition.

Note that the types are specified at maximum moisture content. The densities for the types shown in FIGURE 4 decrease with decreasing moisture content as follows:

*Type 182 (curve 27):*

| Percent moisture: | density |
|---|---|
| 7.9 | 182 |
| 6.5 | 174 |
| 3.7 | 173 |
| 2.2 | 170 |
| 1.1 | 168 |

*Type 192 (curve 28):*

| | |
|---|---|
| 8.2 | 192 |
| 4.0 | 180 |
| 2.2 | 180 |

*Type 215 (curve 29):*

| | |
|---|---|
| 11.5 | 215 |
| 10.0 | 205 |
| 7.6 | 196 |
| 3.8 | 185 |
| 2.3 | 181 |

The analysis of three compositions of type 215 or less show a considerable variation in proportions of size ranges, especially in the No. 6 and No. 12 size ranges. The No. 6 range varies from 5 to 78.8% of the total composition, and the No. 12 range varies from 0.6% to 37.4%.

Figure 5:
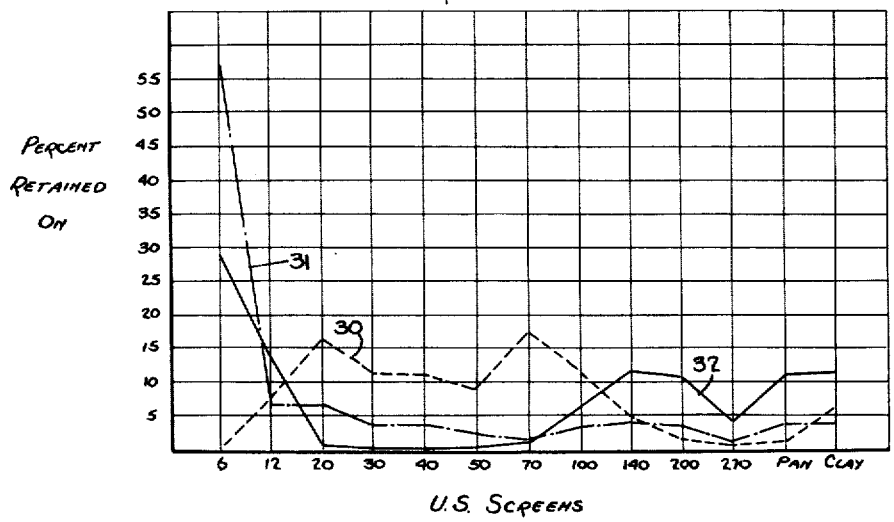
FIG. 5 is a chart showing the screen analyses of three typical compositions in the type 220–225 range.

FIGURE 5 is a chart of the screen analysis of three typical compositions in the type 220–225 range. Curve 30 shows the analysis of a type 220 composition. Curve 31 shows the analysis of a type 223 composition. Curve 32 shows the analysis of another type 223 composition. The variations in proportions of the various particle sizes which might yield a composition in the type 220–225 range are approximated by the maximum and minimum percentages shown on the chart of FIGURE 5. A composition containing a percentage of a sand size not falling within the maximum and minimum percentages of FIGURE 5 would probably fall in another type range than 220–225.

The latitude of proportions of No. 6 size range is relatively large (0.6–55.6%) compared to the other size ranges (none over 17%). The patterns also show that the 270 size range contribution to the composition is relatively low, that the 140 and 200 size ranges contribute a relatively higher proportion, that pan and clay also contribute a higher proportion to the mixture than 270, and that proportions of sizes from 100 to 12 are all less than 17%.

The densities for the types shown in FIGURE 5 decrease with decreasing moisture content as follows:

*Type 220 (curve 30)*

| Percent moisture: | density |
|---|---|
| 14.0 | 220 |
| 7.9 | 192 |
| 4.0 | 182 |
| 2.0 | 169 |
| 0.3 | 163 |

*Type 223 (curve 31)*

| | |
|---|---|
| 9.8 | 223 |
| 7.7 | 214 |
| 3.6 | 196 |
| 2.0 | 192 |

*Type 223 (curve 32)*

| | |
|---|---|
| 14.1 | 223 |
| 7.6 | 205 |
| 4.6 | 191 |
| 2.1 | 184 |

Figure 6:
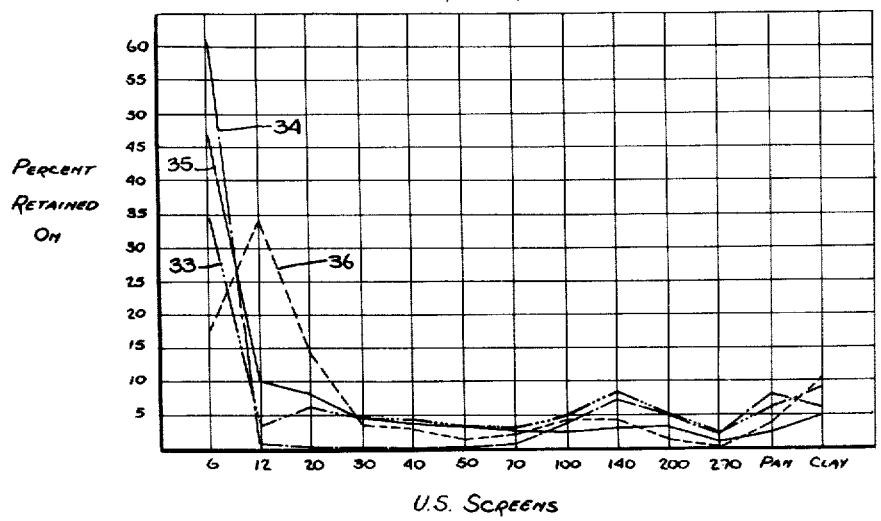
FIG. 6 is a chart showing the screen analyses of four typical compositions in the type 225–230 range.

FIGURE 6 is a chart of the screen analyses of four typical compositions in the type 225–230 range. Curve 33 shows the analysis of a type 225 composition. Curve 34 shows the analysis of another type 225 composition. Curve 35 shows the analysis of a type 228 composition. Curve 36 shows the analysis of another type 228 composition. The variations in proportions of the various particle sizes which might yield a composition in the type 225–230 range are approximated by the maximum and minimum percentages shown in the chart of FIGURE 6. Note that the variation in percentages is more restrictive in the case of the type 225–230 range than in compositions having less density.

The patterns show that the set of densities from type 225–230 require large proportions of the No. 6 size range and generally lesser proportions of the No. 12 size range. These patterns tend to show more restrictive proportions in the ranges other than No. 6 and No. 12 (none over 13.8%). The relative peaks at 140 and pan-clay show more clearly and the trough at 270 is evident. In addition, a definite trough for ranges from 30 to 70 makes itself evident in these curves.

The densities for the types shown in FIGURE 6 decrease with decreasing moisture content as follows:

*Type 225 (curve 33)*

| Percent moisture: | density |
|---|---|
| 10.5 | 225 |
| 8.9 | 218 |
| 4.0 | 196 |
| 3.1 | 193 |
| 2.5 | 190 |

*Type 225 (curve 34)*

| | |
|---|---|
| 12.0 | 225 |
| 10.0 | 220 |
| 7.5 | 200 |

*Type 228 (curve 35)*

| | |
|---|---|
| 10.2 | 228 |
| 8.1 | 213 |
| 3.8 | 194 |
| 2.1 | 190 |

*Type 228 (curve 36)*

| | |
|---|---|
| 12.0 | 228 |
| 7.8 | 206 |
| 3.7 | 179 |
| 2.3 | 173 |

Figure 7:
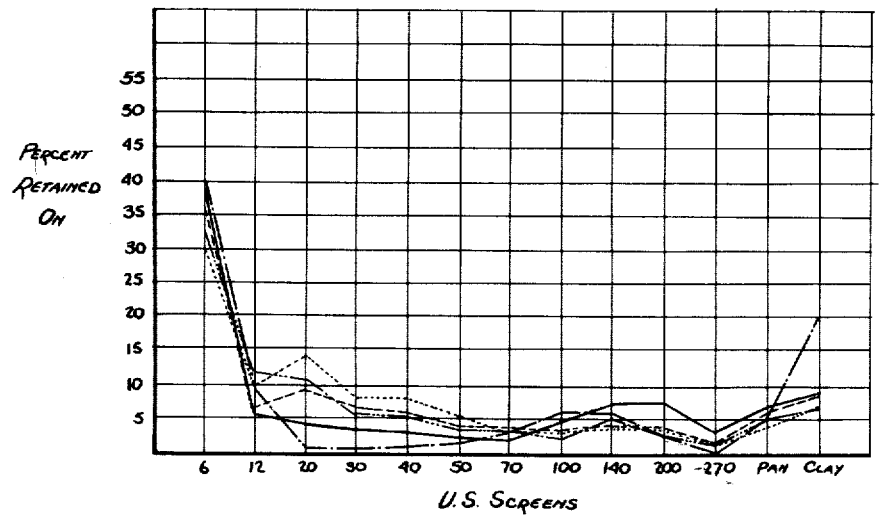
FIG. 7 is a chart showing the screen analyses of five typical compositions in the type 230–235 range.

FIGURE 7 is a chart of the screen analyses of five typical compositions in the type 230–235 range. Curve 37 shows the analysis of a type 230 composition. Curve 38 shows the analysis of a type 231 composition. Curve 39 shows the analysis of a type 233 composition. Curve 40 shows the analysis of a type 234 composition. Curve 41 shows the analysis of a type 235 composition. Note that the analyses variations are more restrictive than the analyses for ranges of less dense compositions.

These curves are seen to fall more closely together than curves for types of lower densities, indicating a more critical set of proportions of sand particle size required to make up a composition more dense than type 230. Highly restrictive proportions of No. 6 (42.4–37.2%) and No. 12 (6.0–11.8%) are required for these higher densities. Troughs at 70 and 270 are clear and peaks at 140 and pan-clay show the greatest latitude is in the No. 20 size (0.4–13.9%).

The densities for the types shown in FIGURE 7 decrease with decreasing moisture as follows:

*Type 230 (curve 37)*

| Percent moisture: | density |
|---|---|
| 12.7 | 230 |
| 8.5 | 200 |
| 4.6 | 180 |
| 2.8 | 170 |

*Type 231 (curve 38)*

| | |
|---|---|
| 11.0 | 231 |
| 7.4 | 218 |
| 3.6 | 195 |
| 2.0 | 190 |

Percent moisture:  density
*Type 233 (curve 39)*
11.2 _____ 233
7.6 _____ 212
4.5 _____ 195
2.0 _____ 187

*Type 234 (curve 40)*
11.0 _____ 234
8.0 _____ 218
3.7 _____ 194
2.2 _____ 187

*Type 235 (curve 41)*
11.5 _____ 235
8.3 _____ 219
3.7 _____ 194
2.4 _____ 189

Figure 8:
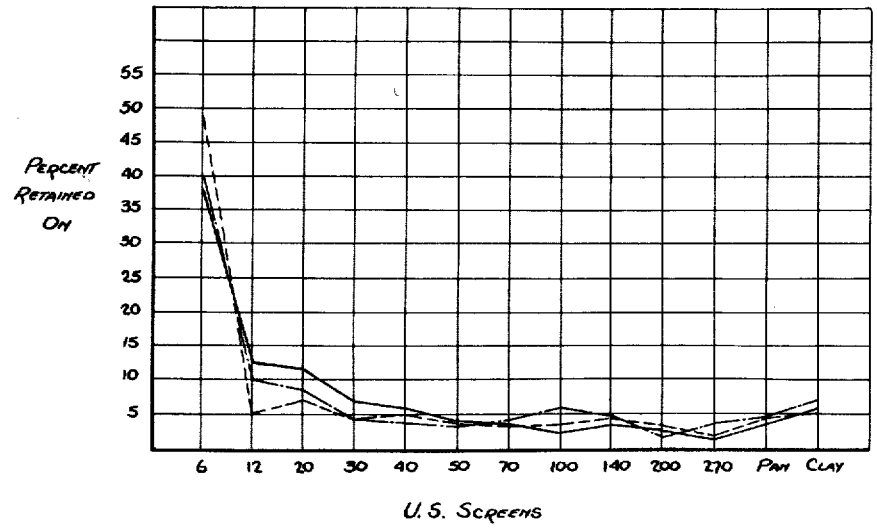
FIG. 8 is a chart showing the screen analyses of three typical type 236 compositions.

FIGURE 8 is a chart of the screen analyses of three typical type 236 compositions. Curves 42, 43 and 44 each show the analysis of a type 236 composition. Note that the variations in proportions for this very dense composition are fairly small.

These curves are for all one density (236) and show a well-defined pattern. The permissible variation in proportions of all sizes are very narrow, with the greatest variation being in the No. 6 (51.2–39.4%) and the No. 12 (12.4–5.0%) sizes. These sizes, however, are related to one another, as more of one requires less than the other. Put another way, the variations in proportion of 6 plus 12 sizes is only 50.8–56.2% among the three specimens. An emphasis is also placed on the proportion of No. 20 (6.8–12.4%). None of the other sizes are over 6.4%. The patterns also show a trough-peak-trough-peak arrangement for screens smaller than size 30. Apparently, if the trough is shifted one size, the remainder of the pattern is similarly shifted.

The densities for the type 236 composition shown in FIGURE 8 decrease with decreasing moisture content as follows:

*Type 236 (curve 42)*
Percent moisture:  density
10.9 _____ 236
8.0 _____ 218
4.8 _____ 200
2.5 _____ 196

*Type 236 (curve 43)*
10.9 _____ 236
8.4 _____ 225
3.8 _____ 198
1.9 _____ 191

*Type 236 (curve 44)*
11.0 _____ 236
9.0 _____ 229
7.4 _____ 220
6.6 _____ 215
3.8 _____ 198.5
2.0 _____ 191

The proportions of sand sizes going to make up a composition having a very high density are the more critical the higher the density. A small variation from the minimum and maximum proportions shown in FIGURE 8 will probably result in a composition having a significantly lower density.

A typical way to install the backfill is as follows: The trench for the cable is dug. The cable is laid in the trench on supports so that the backfill may flow under the cable. The distance allowed between the cable and the bottom and sides of the trench is determined by the heat to be dissipated, the thermal conductivity of the backfill, the predicted moisture conditions, and the thermal resistivity of the surrounding soil.

The backfill is moistured to maximum moisture so that it is in a highly fluid state. The backfill is then poured into the trench, about the cable, and compacted with an appropriate compacting means to insure that no voids are left under the cable and that the backfill contacts the cable throughout. Compacting also achieves maximum density for the installed backfill. The backfill is normally provided with a surface cover of the removed soil.

As is described hereinabove, the compositions of this invention provide for a material in which the proportions of various sized particles are selected to produce a mixture resulting in a very low volume of interstices between the various particles while maximizing the number of those interstices. This is possible because of the proper selection of proportions of various sized particles, thus resulting in a very high density material. In other words, the percentage of the total volume for any selected unit of volume of material, represented by the interstices between the particles is very low. By properly adding correct proportions of clay and water content greater compaction of the composition is possible, resulting in a material having very few voids and a material in which a very great proportion of the interstices between the solid particles have clay and water occupying that space. The large area of contact between the various solid particles makes possible efficient conduction of heat through the very dense compositions of this invention.

It should be understood that the compositions of this invention are not limited to use as backfill, but they may be employed wherever material having excellent heat-conducting properties is required, such as heat exchange devices. They are also highly useful wherever material having extremely high density is useful, such as in making concrete or other similar materials.

What is claimed is:

1. A composition of matter having a dry density greater than 112.5 pounds per cubic foot when compacted and having a thermal resistivity of less than 32.5 rhos when tested with maximum moisture content consisting essentially of 0.6–55.% sand retained on #6 screen, 6.0–12.8% sand retained on #12 screen, 0.6–16.6% sand retained on #20 screen, 0.2–11.4% sand retained on #30 screen, 0.2–11.4% sand retained on #40 screen, 0.4–9.0% sand retained on #50 screen, 1.4–17.0% sand retained on #70 screen, 3.0–11.8% sand retained on #100 screen, 4.2–11.8% sand retained on #140 screen, 1.4–11.0% sand retained on #200 screen, 0.6–4.2% sand retained on #270 screen, 1.2–10.6% pan, and 4.6–11.2% clay analysed by series screening and standard clay analysis.

2. A composition of matter having a dry density greater than 112.5 lbs. per cubic foot when compacted and having a thermal resistivity of about 17.5 rhos consisting essentially of about 6.6% sand retained on a #6 screen, about 11.0% sand retained on a #12 screen, about 16.0% said retained on a #20 screen, about 8.4% sand retained on a #30 screen, about 8.0% sand retained on a #40 screen, about 6.6% sand retained on a #50 screen, about 8.6% sand retained on a #70 screen, about 8.0% sand retained on a #100 screen, about 6.4% sand retained on a #140 screen, about 5.0% sand retained on a #200 screen, about 2.0% sand retained on a #270 screen, about 4.6% pan, and about 8.8% clay analyzed by series screening and standard clay analysis and having about 9.4% moisture present.

3. A composition of matter having a dry density greater than 112.5 lbs. per cubic foot when compacted and having a thermal resistivity of about 14.6 rhos consisting essentially of about 25.6% sand retained on a #6 screen, about 34.4% sand retained on a #12 screen, about 10.6% sand retained on a #20 screen, about 1.4% sand retained on a #30 screen, about 1.0% sand retained on a #40 screen, about .8% sand retained on a #50 screen, about 1.6% sand retained on a #70 screen, about 3.0% sand retained on a #100 screen, about 4.8% sand retained on a #140 screen, about 4.8% sand retained on a #200 screen, about 1.8% sand retained on a #270 screen, about 4.4% pan, and about 5.8% clay analyzed by series screening and standard clay analysis and having about 8.6% moisture present.

4. A composition of matter having a dry density greater than 112.5 lbs. per cubic foot when compacted and having a thermal resistivity of about 13.5 rhos consisting essentially of about 15.8% sand retained on a #6 screen, about 29.0% sand retained on a #12 screen, about 15.8% sand retained on a #20 screen, about 4.0% sand retained on a #30 screen, about 3.6% sand retained on a #40 screen, about 3.0% sand retained on a #50 screen, about 3.0% sand retained on a #70 screen, about 3.2% sand retained on a #100 screen, about 4.6% sand retained on a #140 screen, about 4.6% sand retained on a #200 screen, about 2.0% sand retained on a #270 screen, about 4.4% pan, and about 7.0% clay analyzed by series screening and standard clay analysis and having about 8.0% moisture present.

5. A composition of matter having a dry density greater than 112.5 lbs. per cubic foot when compacted and having a thermal resistivity of about 9.5 rhos consisting essentially of about 35.8% sand retained on a #6 screen, about 22.8% sand retained on a #12 screen, about 11.2% sand retained on a #20 screen, about 4.6% sand retained on a #30 screen, about 4.2% sand retained on a #40 screen, about 2.8% sand retained on a #30 screen, about 2.8% sand retained on a #70 screen, about 2.4% sand retained on a #100 screen, about 2.8% sand retained on a #140 screen, about 2.6% sand retained on a #200 screen, about 0.8% sand retained on a #270 screen, about 2.8% pan, and about 4.4% clay analyzed by series screening and standard clay analysis and having about 8.8% moisture present.

6. A composition of matter having a dry density greater than 112.5 lbs. per cubic foot when compacted and having a thermal resistivity of about 7.9 rhos consisting essentially af about 41.4% sand retained on a #6 screen, about 17.0% sand retained on a #12 screen, about 7.0% sand retained on a #20 screen, about 3.2% sand retained on a #30 screen, about 3.4% sand retained on a #40 screen, about 2.6% sand retained on a #50 screen, about 3.0% sand retained on a #70 screen, about 3.2% sand retained on a #100 screen, about 4.0% sand retained on a #140 screen, about 4.0% sand retained on a #200 screen, about 1.4% sand retained on a #270 screen, about 3.6% pan, and about 6.2% clay analyzed by series screening and standard clay analysis and having about 8.8% moisture present.

7. In a dense composition of matter, consisting essentially of silica sand, an amount of clay which is sufficient to occupy interstices between the sand particles of said composition extensively and moisture sufficient to lubricate said particles and said clay to facilitate thorough compaction thereof and to fill any remaining voids in said composition, said sand particles being of selected size ranges in proportions suited to produce a mixture having a maximum number of minimum-sized interstices between said particles, said composition being characterized by having a density greater than 215 grams per 6.28 cubic inches standard foundry test specimen when rammed three times with maximum water content under standard foundry testing techniques and having a thermal resistivity of less than 32.5 rhos when tested with maximum moisture content; said selected size ranges and proportions being substantially as follows: 0.6–55.6% sand retained on #6 screen, 6.0–12.8% sand retained #12 screen, 0.6–16.6% sand retained on #20 screen, 0.2–11.4% sand retained on #30 screen, 0.2–11.4% sand retained on #40 screen, 0.4–9.0% sand retained on #50 screen, 1.4–17.0% sand retained on #70 screen, 3.0–11.8% sand retained on #100 screen, 4.2–11.8% sand retained on #140 screen, 1.4–11.0% sand retained on #200 screen, 0.6–4.2% sand retained on #270 screen; said clay being present in an amount between 4.6% and 11.2% and said moisture being maximum moisture that said composition is capable of containing under compaction.

8. In a dense composition of matter, consisting essentially of sand particles, an amount of clay which is sufficient to occupy interstices between the sand particles of said composition extensively and moisture sufficient to lubricate said particles and said clay to facilitate thorough compaction thereof and to fill any remaining voids in said composition, said sand particles being of selected size ranges in proportions suited to produce a mixture having a maximum number of minimum-sized interstices between said particles, said composition being characterized by having a density greater than 215 grams per 6.28 cubic inches standard foundry test specimen when rammed three times with maximum water content under standard foundry testing techniques; said selected size ranges and proportions being substantially as follows: 0.6–55.6% sand retained on #6 screen, 6.0–12.8% sand retained on #12 screen, 0.6–16.6% sand retained on #20 screen, 0.2–11.4% sand retained on #30 screen, 0.2–11.4% sand retained on #40 screen, 0.4–9.0% sand retained on #50 screen, 1.4–17.0% sand retained on #70 screen, 3.0–11.8% sand retained on #100 screen, 4.2–11.8% sand retained on #140 screen, 1.4–11.0% sand retained on #200 screen, 0.6–4.2% sand retained on #270 screen; said clay being present in an amount between 4.6% and 11.2% and said moisture being maximum moisture that said composition is capable of containing under compaction.

References Cited in the file of this patent

Lea et al.: "The Chemistry of Cement and Concrete," 1956, page 510.

Abraham: "Asphalts and Allied Substances," fifth edition, 1945, pages 636, and 637, and Table LXXXII-A opposite page 646.

Lee et al.: "The Chemistry of Cement and Concrete," 1956, page 484.

UNITED STATES PATENT OFFICE
CERTIFICATE OF CORRECTION

Patent No. 3,082,111 March 19, 1963

Robert J. Maddison et al.

It is hereby certified that error appears in the above numbered patent requiring correction and that the said Letters Patent should read as corrected below.

Column 4, line 16, for "unusal" read -- unusual --; column 12, line 40, for "0.6-55%" read -- 0.6-55.6% --; column 14, line 10, after "retained" insert -- on --; line 15, for "and" read -- sand --.

Signed and sealed this 12th day of November 1963.

(SEAL)
Attest:

ERNEST W. SWIDER

Attesting Officer

EDWIN L. REYNOLDS

Acting Commissioner of Patents